May 15, 1934.  L. F. BLUME  1,959,153

VOLTAGE CONTROL IN ELECTRICAL POWER TRANSMISSION CIRCUITS

Filed April 29, 1933

Inventor:
Louis F. Blume,
by Chas E. Tullar
His Attorney.

Patented May 15, 1934

1,959,153

UNITED STATES PATENT OFFICE 1,959,153

VOLTAGE CONTROL IN ELECTRICAL POWER TRANSMISSION CIRCUITS

Louis F. Blume, Pittsfield, Mass., assignor to General Electric Company, a corporation of New York Application April 29, 1933, Serial No. 668,606

4 Claims. (Cl. 171—119)

My invention relates to voltage control in electrical power transmission circuits. The magnitude or phase angle or both the magnitude and phase angle of the voltage of an electrical power transmission circuit is commonly controlled or regulated by a series transformer connected in the circuit and excited by an exciting transformer, the excitation for the exciting transformer being derived from the section of the circuit at one side or the other of the series transformer. The current and load conditions are sometimes such that the voltage of each section of the circuit will vary through a considerable range and the general object of the invention is to provide an improved voltage regulating arrangement of this type in which the voltage impressed on the exciting transformer will be more nearly constant, thereby reducing the size and cost of this transformer.

Even though there may be considerable variation in the voltages in both sections of the circuit, I have found that it is often possible to select some intermediate point of the series transformer winding the voltage of which remains substantially constant and, in accordance with the invention, the excitation of the exciting transformer is derived from such an intermediate point of the series transformer.

Figure 1:
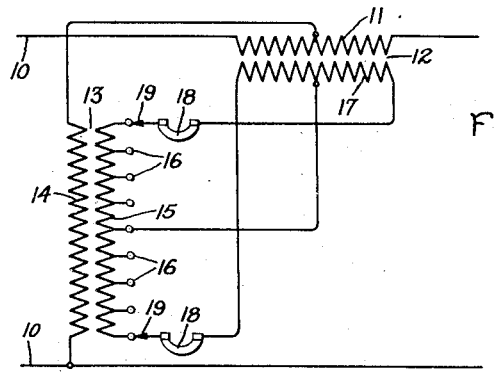
Figure 2:
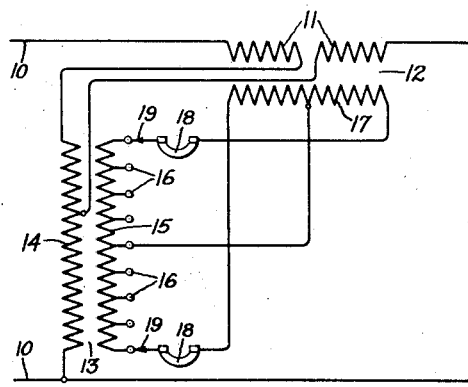
Figure 3:
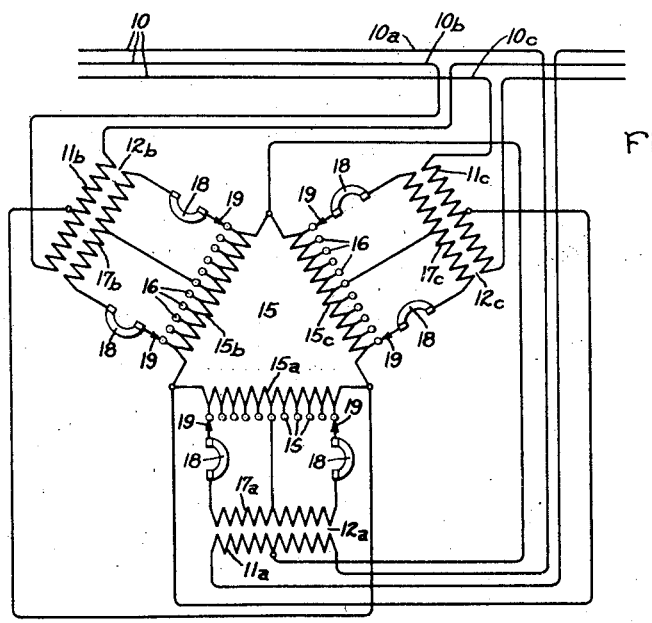

The invention will be better understood from the following description taken in connection with the accompanying drawing in which Fig. 1 shows diagrammatically an electrical power transmission circuit provided with a voltage regulating series transformer and an exciting transformer arranged in accordance with the invention; Fig. 2 shows a form of the invention including an auto transformer connection; and Fig. 3 shows a three phase circuit provided with series and exciting transformers arranged in accordance with the invention.

The single phase electrical power transmission circuit 10 shown in Fig. 1 has one winding 11 of a series transformer 12 connected in series with one side of the circuit. A transformer 13 for exciting the series transformer 12 has one winding 14 connected between an intermediate point of the winding 11 and the other side of the circuit 10. A second winding 15 of the exciting transformer 13 is provided with tap connections 16. A second winding 17 of the series transformer 12 is connected through circuit breakers 18 to contacts 19 which are movable over the tap connections 16. The centers of the two windings 15 and 17 are connected together.

It is assumed that the voltages in both sections of the circuit 10 connected by the series transformer 12 may vary considerably and that the winding 14 of the exciting transformer 13 is connected to that point in the winding 11 which has constant or nearly constant voltage. It will generally be preferable to connect the winding 14 to the center of the winding 11. Thus, a constant or nearly constant voltage is impressed on the winding 14 and the exciting transformer 13 need be designed for only this minimum voltage variation. A voltage depending on the positions of the movable contacts 19 is impressed on the winding 17 and the desired voltage is induced in the winding 11 to raise or lower the voltage of one section of the circuit 10 with respect to the other section. This voltage in the winding 11 may be adjusted or regulated as desired by moving the contacts 19 one at a time, the corresponding circuit breaker 18 being opened while the position of each contact 19 is changed to prevent arcing and injury to the contacts. The positions of the contacts 19 may be changed one at a time without interrupting the excitation of the series transformer 12 because while either section of the winding 15 is disconnected from the corresponding section of the winding 17, the other section of the winding 15 is still connected to a section of the winding 17 through the other contact 19 and the connection between the centers of the two windings 15 and 17.

In the arrangement shown in Fig. 2, the two sections of the circuit 10 have different voltage ratings and are connected to the winding 14 as an auto transformer, one section being connected to the high voltage terminal of the winding and the other section to an intermediate tap. The winding 11 of the series transformer is formed in two sections connected respectively between the two sections of the circuit 10 and the winding 14. The transformer 13 also acts as an exciting transformer through the winding 15 which induces a voltage in the winding 11 of the series transformer 12 and so excites this series transformer as has been described in connection with the winding 15 of Fig. 1.

The electrical transmission circuit 10 of Fig. 3 is a three phase circuit including three conductors 10a, 10b and 10c. The windings 11a, 11b and 11c of three series transformers 12a, 12b and 12c are connected respectively in series with the three conductors 10a, 10b and 10c of the circuit 10. Three windings 15a, 15b and 15c, each provided with tap connections 16, are connected in a closed delta to form a three phase exciting winding 15. Each of the series transformers 12a, 12b and 12c has a second winding 17a, 17b and 17c respectively. The three windings 17a, 17b and 17c are connected through circuit breakers 18 to contacts 19 which are movable over the tap connections 16 of the three windings 15a, 15b and 15c respectively. The centers of the three windings 17a, 17b and 17c are connected to the centers of the three windings 15a, 15b and 15c respectively. Voltage is impressed on the three phase delta winding 15 through connections from the three corners of the delta to the centers of other suitable intermediate points of the series windings 11a, 11b and 11c.

The voltage of each of the windings 15a, 15b and 15c is of course vectorially at right angles to the voltage of the opposite corner of the delta formed by these windings. Each of the windings 15a, 15b and 15c is connected through its movable contacts 19 and circuit breakers 18 to the same one of the series transformer 12a, 12b and 12c to which the opposite corner of the delta winding 15 is connected. Thus, a quadrature voltage is introduced into each of the conductors of the circuit 10 and, by adjusting the positions of the movable contacts 19 in the manner already described in connection with the contacts 19 of Fig. 1, the phase angle between the voltages of the two sections of the circuit 10 may be adjusted and regulated as desired. Furthermore, if the positions of the two contacts 19 of each pair are always adjusted so as to keep them symmetrical and equally spaced from the center of their winding, the phase angle adjustment between the two sections of the circuit 10 is made without any substantial change in the ratio between the voltages of the two sections of the circuit 10.

The invention has been explained by describing and illustrating certain preferred arrangements and applications thereof but it will be apparent that other changes may be made without departing from the spirit of the invention and the scope of the appended claims.

What I claim as new and desire to secure by Letters Patent of the United States, is,—

1. The combination with an electrical transmission circuit of a series transformer having two windings, one of said windings being connected in series with one side of said circuit, an exciting transformer having a winding connected between an intermediate point of said series connected winding and the other side of said circuit, and means connecting said exciting transformer to the second winding of said series transformer to excite the series transformer.

2. The combination with an electrical transmission circuit of a series transformer having two windings, one of said windings being connected in series with one side of said circuit, an exciting transformer connected between an intermediate point of said series connected winding and the other side of said circuit and being provided with tap connections, and contacts connected to the second winding of said series transformer, said contacts being movable over said tap connections to regulate the voltage induced in said series connected winding.

3. The combination with a three phase electrical transmission circuit of three series transformers having windings connected in series with the three conductors of said circuit respectively, and a three phase exciting winding connected between intermediate points of said three series connected windings, each of said three series transformers having a second winding connected to said exciting winding for inducing voltages in said three series connected windings.

4. The combination with a three phase electrical transmission circuit of three series transformers having windings connected in series with the three conductors of said circuit respectively, each of said series transformers having a second winding, three delta connected exciting windings provided with tap connections, the three corners of said delta being connected to intermediate points respectively of said series connected windings, and means including contacts movable over said tap connections for connecting the second winding of each series transformer to the tap connections of the exciting winding opposite the corner to which the corresponding series winding is connected.

LOUIS F. BLUME.